US012708933B2

(12) United States Patent
Katsuta

(10) Patent No.: US 12,708,933 B2
(45) Date of Patent: Aug. 18, 2026

(54) FOREIGN SUBSTANCE REMOVING METHOD, FILM FORMING METHOD, ARTICLE MANUFACTURING METHOD, AND FOREIGN SUBSTANCE REMOVING APPARATUS

(71) Applicant: CANON KABUSHIKI KAISHA, Tokyo (JP)

(72) Inventor: Ken Katsuta, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 126 days.

(21) Appl. No.: 18/598,317

(22) Filed: Mar. 7, 2024

(65) Prior Publication Data

US 2024/0316603 A1 Sep. 26, 2024

(30) Foreign Application Priority Data

Mar. 24, 2023 (JP) ................................ 2023-048613

(51) Int. Cl.
*B08B 7/00* (2006.01)

(52) U.S. Cl.
CPC ................................ *B08B 7/0014* (2013.01)

(58) Field of Classification Search
None
See application file for complete search history.

(56) References Cited

U.S. PATENT DOCUMENTS 8,202,463 B2 6/2012 Yoneda et al.

FOREIGN PATENT DOCUMENTS

JP 5121549 B2 1/2013

OTHER PUBLICATIONS

Google Patents translation of JP5121549B2 (Year: 2025).*

* cited by examiner

*Primary Examiner* — Eric W Golightly
(74) *Attorney, Agent, or Firm* — ROSSI, KIMMS & McDOWELL LLP

(57) ABSTRACT

A method for removing a foreign substance includes forming a first trapping film between a plate and a first region where a foreign substance should be removed and separating the plate from the first region together with the first trapping film, forming a second trapping film between the plate holding the first trapping film and a second region where a foreign substance should be removed, and separating the plate from the second region together with the first trapping film and the second trapping film. The second region is larger than the first region. A value obtained by dividing a volume of the second trapping film by an area of the second region is larger than a value obtained by dividing a volume of the first trapping film by an area of the first region.

14 Claims, 7 Drawing Sheets

115
104
201
104
102
Z
X
Y 116
114
112
113
110
109
103
105
104
201
202
102
Z
X
Y 111
113
112
114
110
109
103
201
202
102
Z
X
Y 114
113
112
110
109
103
201
203
102
Z
X
Y

FOREIGN SUBSTANCE REMOVING METHOD, FILM FORMING METHOD, ARTICLE MANUFACTURING METHOD, AND FOREIGN SUBSTANCE REMOVING APPARATUS

BACKGROUND OF THE INVENTION

Field of the Invention

The present invention relates to a foreign substance removing method, a film forming method, an article manufacturing method, and a foreign substance removing apparatus.

Description of the Related Art

In Japanese Patent No. 5121549, a method of removing particles from a template is described. In this method, a photocuring resin is applied onto a dummy substrate, a template is pressed against the photocuring resin, the photocuring resin is irradiated with light and cured, and the template is then separated from the cured product film of the photocuring resin. Particles adhered to the template are thus removed from the template.

The present inventor examined removing a foreign substance on a substrate by pressing a plate against the substrate via a curable composition, curing the curable composition, and separating the cured product film of the curable composition from the substrate together with the plate. The plate may be, for example, a template. In this foreign substance removing method, the cured product including the foreign substance remains on the plate. The present inventor also examined removing a foreign substance sequentially from a plurality of regions of a substrate while depositing a cured product film on a plate a plurality of times for efficient foreign substance removal. However, if the foreign substance removing step is repeated for the plurality of regions having sizes different from each other on the substrate while depositing the cured product film on the plate a plurality of times, the cured product film deposited on the plate may be not flat. For example, if the foreign substance removing step is executed for a partial field of a substrate (a field having a shape along the edge of the substrate), a first cured product film having a size corresponding to the size of the partial field remains on the plate. If, after that, the plate with the first cured product film having a size smaller than the size of the full field (a field having a rectangular shape) of the substrate is pressed against the curable composition applied onto the full field of the substrate, a pressing pressure may be unevenly applied to the curable composition. Also, after the foreign substance removing step for the full field, a second cured product film remains on the plate to cover the first cured product film. The surface shape of the second cured product film may be a convex shape reflecting the surface shape of a structure formed by the first cured product film and the plate.

SUMMARY OF THE INVENTION

The present invention provides a technique advantageous in removing a foreign substance from a plurality of regions having sizes different from each other.

A first aspect of the present invention provides a foreign substance removing method for removing a foreign substance, comprising: forming a first foreign substance trapping film between a plate and a first region where a foreign substance should be removed and separating the plate from the first region together with the first foreign substance trapping film; and after the forming the first foreign substance trapping film, forming a second foreign substance trapping film between the plate that holds the first foreign substance trapping film and a second region where a foreign substance should be removed, and separating the plate from the second region together with the first foreign substance trapping film and the second foreign substance trapping film, wherein the second region is larger than the first region, and a value obtained by dividing a volume of the second foreign substance trapping film by an area of the second region is larger than a value obtained by dividing a volume of the first foreign substance trapping film by an area of the first region.

Further features of the present invention will become apparent from the following description of exemplary embodiments with reference to the attached drawings.

DESCRIPTION OF THE EMBODIMENTS

Figure 1:
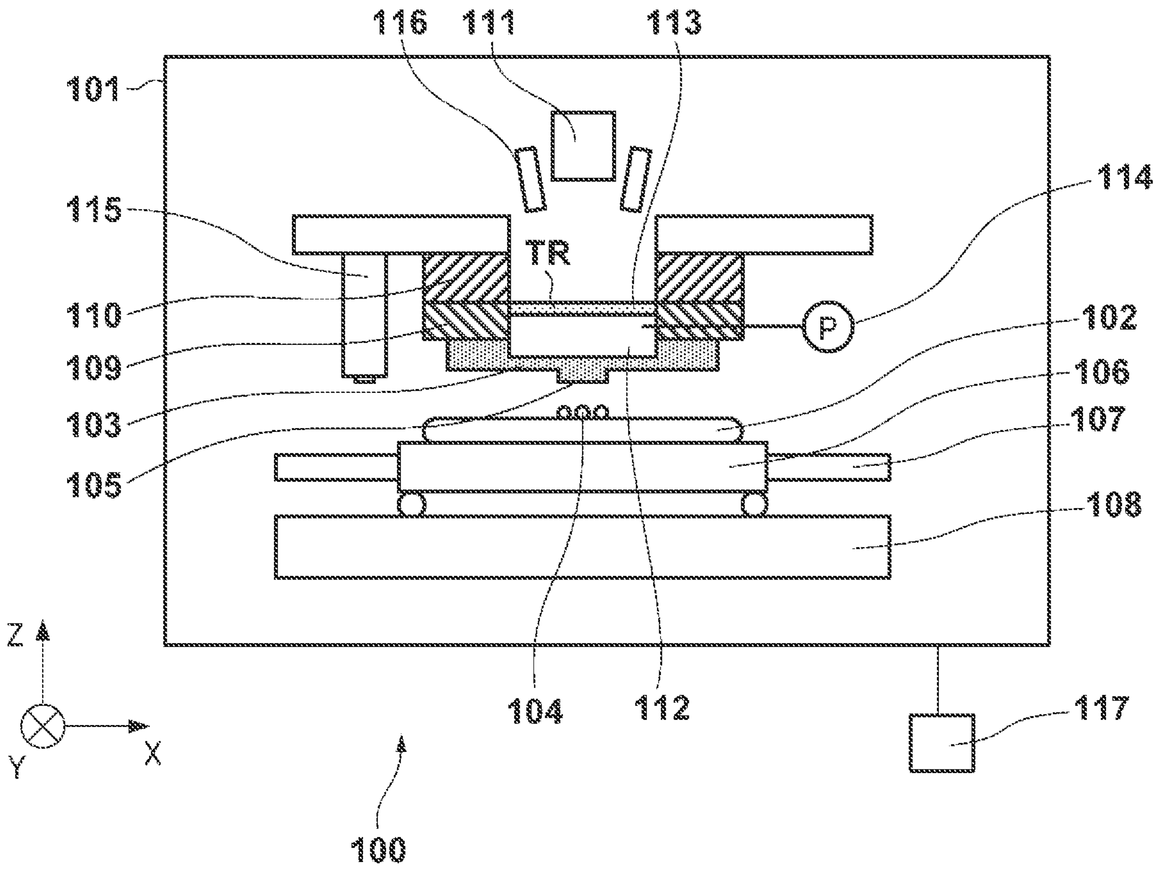
FIG. 1 is a view schematically showing the configuration of a foreign substance removing apparatus according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a view showing the configuration of a foreign substance removing apparatus 100 according to the first embodiment of the present disclosure. The foreign substance removing apparatus 100 according to the first embodiment can be configured to execute a foreign substance removing method using an imprint technique. In this foreign substance removing method, a cured product film of a foreign substance removing material 104 is formed between a substrate 102 as the target of foreign substance removal and a plate 103 for foreign substance removal (cleaning), and the cured product film traps a foreign substance. After that, the plate

103 is separated from the substrate 102 together with the cured product of the foreign substance removing material 104, thereby removing the foreign substance on the substrate 102.

As the material of the substrate 102, for example, glass, a ceramic, a metal, a semiconductor, a resin, or the like can be used. The substrate 102 may be a wafer, and one or a plurality of layers may be provided on the surface of the wafer. The wafer can be, for example, a silicon wafer or a compound semiconductor wafer. The substrate 102 may be a silica glass plate.

As the foreign substance removing material 104, a curable composition is preferable. The curable composition is a material that is cured upon receiving curing energy. As the curing energy, an electromagnetic wave or heat is used. The electromagnetic wave includes, for example, light whose wavelength is selected from a range of 10 nm (inclusive) to 1 mm (inclusive) more specifically, infrared rays, a visible light beam, and ultraviolet rays. The foreign substance removing material 104 may be understood as a composition that is cured by light irradiation or heating. The photocuring foreign substance removing material to be cured by light irradiation contains at least a polymerizable compound and a photopolymerization initiator, and may further contain a nonpolymerizable compound or a solvent as needed. The nonpolymerizable compound is at least one material selected from the group consisting of a sensitizer, a hydrogen donor, an internal mold release agent, a surfactant, an antioxidant, and a polymer component. The viscosity (the viscosity at 25° C.) of the foreign substance removing material 104 is, for example, 1 mPa·s (inclusive) to 100 mPa·s (inclusive). In this embodiment, a description will be made using a material to be cured by light.

The plate 103 can have a plate shape. The plate 103 can include a film holding region 105 that is a region configured to hold a cured product film (foreign substance trapping film) of the foreign substance removing material 104. The film holding region 105 is provided on a surface facing the substrate 102, and can function as a region configured to form and hold a cured product film (foreign substance trapping film) of the foreign substance removing material 104. The film holding region 105 can be formed by a plane that is one level higher than the peripheral surface of the film holding region 105. The foreign substance removing material 104 on the substrate 102 and the film holding region 105 are brought into contact, the space between the substrate 102 and the film holding region 105 is filled with the foreign substance removing material 104, and the foreign substance removing material 104 is then cured, thereby forming a cured product film serving as a foreign substance trapping film. The plate 103 can be formed by, for example, a material that transmits curing energy (curing light) for curing the foreign substance removing material 104, for example, silica glass.

In this specification and the accompanying drawings, directions are indicated on an XYZ coordinate system in which an XY plane is defined along directions parallel to the surface of the substrate 102 held by a substrate holder 106 to be described later. Directions parallel to the X-axis, the Y-axis, and the Z-axis of the XYZ coordinate system will be defined as the X direction, the Y direction, and the Z direction, respectively, and rotation about the X-axis, rotation about the Y-axis, and rotation about the Z-axis will be defined as θX, θY, and θZ, respectively. Control or driving concerning the X-axis, the Y-axis, and the Z-axis means control or driving concerning a direction parallel to the X-axis, a direction parallel to the Y-axis, and a direction parallel to the Z-axis, respectively. Also, control or driving concerning the θX-axis, the θY-axis, and the θZ-axis means control or driving concerning rotation about an axis parallel to the X-axis, rotation about an axis parallel to the Y-axis, and rotation about an axis parallel to the Z-axis, respectively. A position is information specified based on the coordinates of the X-axis, the Y-axis, and the Z-axis, and a posture is information specified by the values of the θX-axis, the θY-axis, and the θZ-axis. Positioning means controlling a position and/or a posture.

The foreign substance removing apparatus 100 can include a main body 101 and a controller 117. In an aspect, the main body 101 itself may be understood as a foreign substance removing apparatus. The main body 101 can include the substrate holder 106 that holds the substrate 102, a substrate driving mechanism 107 that drives the substrate holder 106 to move the substrate 102, and a support base 108 that supports the substrate driving mechanism 107. The main body 101 can also include a plate holder 109 that holds the plate 103, and a plate driving mechanism 110 that drives the plate holder 109 to move the plate 103.

The substrate driving mechanism 107 and the plate driving mechanism 110 form a relative movement mechanism that moves at least one of the substrate 102 and the plate 103 to adjust the relative position between the substrate 102 and the plate 103. Adjustment of the relative position between the substrate 102 and the plate 103 by the relative movement mechanism can include driving for bringing the foreign substance removing material 104 on the substrate 102 into contact with the plate 103, and driving for separating the plate 103 from the substrate 102 together with the foreign substance removing material 104. Also, adjustment of the relative position between the substrate 102 and the plate 103 by the relative movement mechanism includes alignment between the substrate 102 and the plate 103. The substrate driving mechanism 107 is configured to drive the substrate 102 concerning a plurality of axes (for example, three axes including the X-axis, the Y-axis, and the θZ-axis, preferably, six axes including the X-axis, the Y-axis, the Z-axis, θX-axis, the θY-axis, and the θZ-axis). The plate driving mechanism 110 can be configured to drive the plate 103 concerning a plurality of axes (for example, three axes including the Z-axis, the θX-axis, and the θY-axis, preferably, six axes including the X-axis, the Y-axis, the Z-axis, θX-axis, the θY-axis, and the θZ-axis).

The foreign substance removing apparatus 100 or the main body 101 includes a curing unit 111 configured to cure the foreign substance removing material 104 filled in the space between the substrate 102 and the plate 103. The curing unit 111, for example, gives curing energy to the foreign substance removing material 104 via the plate 103, thereby curing the foreign substance removing material 104 on the substrate 102. The foreign substance removing apparatus 100 or the main body 101 can include a transmission member 113 configured to form a control space 112 on the back surface side of the plate 103 (the opposite side of the surface facing the substrate 102). The transmission member 113 is made of a material that transmits curing energy from the curing unit 111, and enables application of curing energy to the foreign substance removing material 104 on the substrate 102.

The foreign substance removing apparatus 100 or the main body 101 includes a pressure controller 114 that controls the pressure in the control space 112, thereby controlling deformation of the plate 103 in the Z-axis direction. For example, when the pressure controller 114 makes the pressure in the pressure in the control space 112 higher than the atmospheric pressure, the plate 103 is deformed in a convex shape toward the substrate 102. The foreign substance removing apparatus 100 or the main body 101 can include an application unit 115 configured to arrange, supply, or distribute the foreign substance removing material 104 onto the substrate 102. The application unit 115 can be configured to apply the foreign substance removing material 104 as droplets to the substrate 102. The arrangement of droplets of the foreign substance removing material 104 and the amount of each droplet can arbitrarily be decided. The substrate 102 on which the foreign substance removing material 104 is arranged by another device may be supplied (loaded) into the foreign substance removing apparatus 100. In this case, the foreign substance removing apparatus 100 may not include the application unit 115. The foreign substance removing apparatus 100 or the main body 101 may include a measurement unit 116 configured to measure misalignment (alignment error) between the substrate 102 (or a partial region of the substrate 102) and the plate 103.

The controller 117 can be configured to control the substrate driving mechanism 107, the plate driving mechanism 110, the curing unit 111, the pressure controller 114, the application unit 115, and the measurement unit 116. In another viewpoint, the controller 117 controls an operation of removing a foreign substance on the substrate 102. The controller 117 is formed by, for example, a general-purpose or dedicated computer. The controller 117 may be formed by a PLD (an abbreviation of Programmable Logic Device) such as an FPGA (an abbreviation of Field Programmable Gate Array), or an ASIC (an abbreviation of Application Specific Integrated Circuit).

FIGS. 2A to 2D schematically show a foreign substance removing method to be executed by the foreign substance removing apparatus 100. The foreign substance removing method includes a foreign substance removing step for each of a plurality of regions of the substrate 102. One foreign substance removing step is a process of removing a foreign substance from one region selected from the plurality of regions of the substrate 102. Each foreign substance removing step can include an application step, a contact step, a curing step, and a separation step. The coordinate system shown in FIGS. 2A to 2D complies with the coordinate system shown in FIG. 1. The foreign substance removing step may be executed for a region where the existence of a foreign substance is confirmed or detected, or may be executed for a region where whether a foreign substance exists is unknown. In the latter case, nonexistence of a foreign substance in the region for which the foreign substance removing step has been executed can be guaranteed.

Figures 2A, 2B, 2C, 2D:
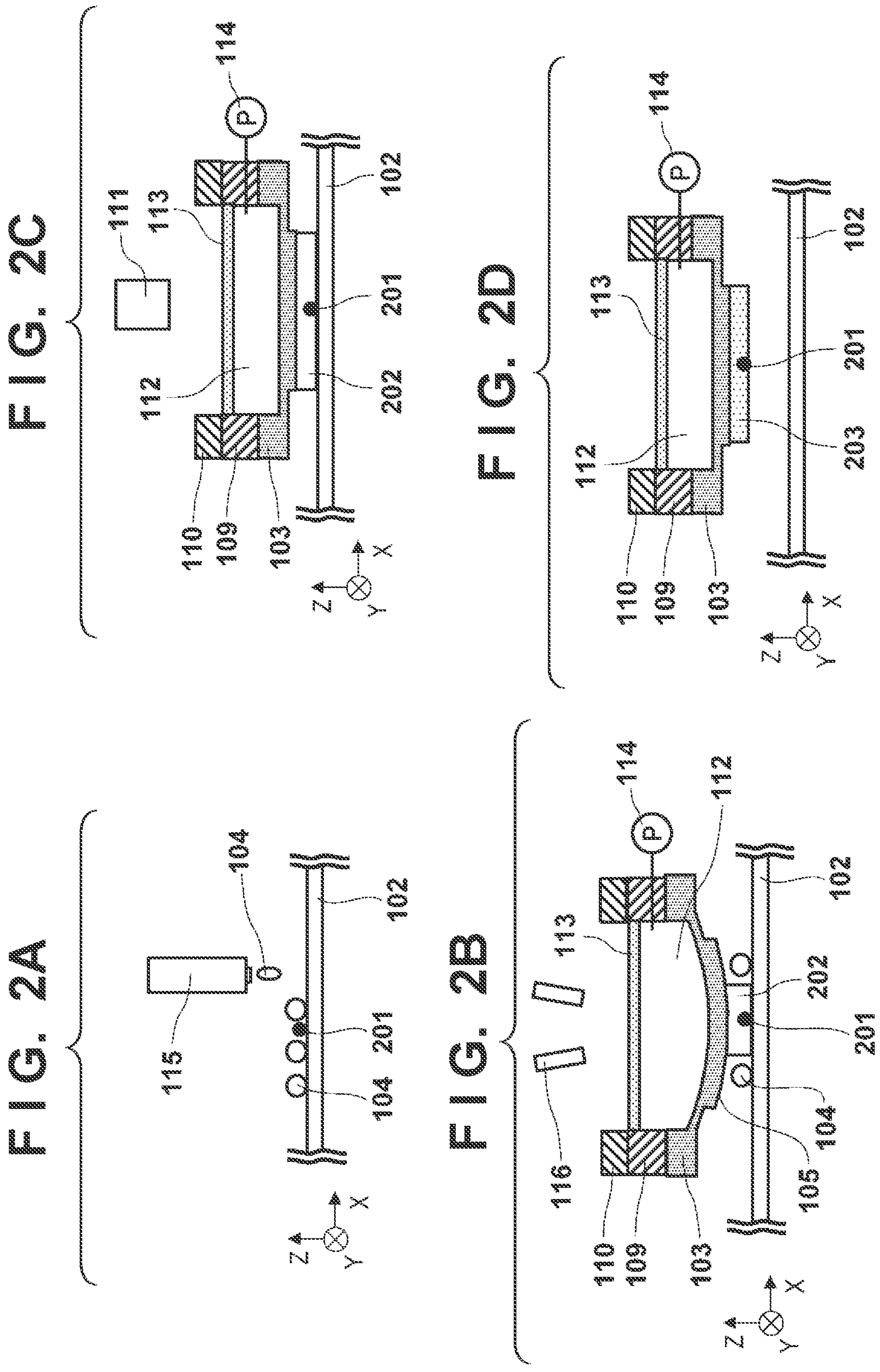
FIGS. 2A to 2D are views schematically showing an example of a foreign substance removing method.

The application step will be described with reference to FIG. 2A. In the application step, the application unit 115 applies the foreign substance removing material 104 to a region (field) of the substrate 102, more specifically, a region where a foreign substance should be removed. The foreign substance removing material 104 is discharged as a plurality of droplets by the application unit 115 and thus applied to the region of the substrate 102. The application or arrangement of droplets of the foreign substance removing material 104 onto the substrate 102 (region) can be controlled by droplet control information (droplet list). The droplet control information can include, for each droplet, parameter values indicating the amount of one droplet and its application position (the x-coordinate and the y-coordinate) on the substrate 102 (region). The droplet control information can be prepared for each region where the foreign substance removing step is executed. The droplet control information can include, for each region to execute the foreign substance removing step, information representing the total amount of the foreign substance removing material 104 and the application range to the substrate 102. Based on the droplet control information, the controller 117 can control application of droplets to each region where the foreign substance removing step is to be executed. The controller 117 may acquire droplet control information from an external device, or may generate droplet control information based on the arrangement of a plurality of regions on the substrate 102 and/or the arrangement (inspection result) of a foreign substance.

The driving method of the foreign substance removing material 104 (droplets) by the application unit 115 is not limited to a specific method, and an electric drive type driving element, for example, a piezoelectric actuator can be employed. If a piezoelectric actuator is employed, the amount of a droplet can be controlled by controlling the value of a voltage to be applied to the piezoelectric actuator. The application position can be controlled by controlling the relative position between the substrate 102 and the application unit 115 and the discharge timing of each droplet. The position of the substrate 102 is controlled by controlling the substrate driving mechanism 107 by the controller 117. The application unit 115 may be provided as an external device of the foreign substance removing apparatus 100 and, in this case, the substrate 102 to which the foreign substance removing material 104 is applied by the application unit 115 that is an external device can be provided to the foreign substance removing apparatus 100.

The contact step will be described with reference to FIG. 2B. In the contact step, the plate 103 is pressed against the foreign substance removing material 104 applied onto the substrate 102, thereby filling the space between the substrate 102 and the plate 103 with the foreign substance removing material 104 to form a liquid film 202. The liquid film 202 can be formed when the film holding region 105 of the plate 103 spreads the plurality of droplets of the foreign substance removing material 104 and connects these with each other. The thickness (Z-direction size) and the area (the area on the XY plane) of the liquid film 202 can be controlled in accordance with the above-described droplet control information.

In the contact step, the interval between the substrate 102 and the plate 103 can be adjusted by the above-described relative movement mechanism. In an example, the relative position of the plate 103 with respect to the substrate 102 in the Z direction can be adjusted by the plate driving mechanism 110. In the contact step, the center of the film holding region 105 is brought into contact with the foreign substance removing material 104 first, thereby reducing bubbles involved in the liquid film 202. It is therefore preferable to raise the pressure in the control space 112 by the pressure controller 114 to bend the center portion of the plate 103 downward in a convex shape. Hence, the position of the plate 103 in the Z direction can be controlled first such that the film holding region 105 bent in a convex shape does not come into contact with the droplets of the foreign substance removing material 104 applied onto the substrate 102. After that, the position of the substrate 102 in the X and Y directions with respect to the plate 103 can be adjusted by the substrate driving mechanism 107. At this time, alignment between the substrate 102 and the plate 103 can be performed while measuring alignment marks provided on the substrate 102 and the plate 103 using the measurement unit 116.

After alignment is completed, the plate 103 bent in the convex shape is driven toward the substrate 102 by the plate driving mechanism 110, and the film holding region 105 of the plate 103 is pressed against the plurality of droplets of the foreign substance removing material 104 on the substrate 102. A force generated by the plate driving mechanism 110 at this time can be called a pressing force. The pressing force can be controlled by the controller 117. At the time of pressing, the pressure in the control space 112 can be controlled by the pressure controller 114 such that the convex shape of the plate 103 is gradually relaxed. The pressure in the control space 112 can be controlled such that the liquid film 202 obtains a predetermined thickness when filling is completed.

The curing step will be described with reference to FIG. 2C. In the curing step, the liquid film 202 is cured, thereby forming a foreign substance trapping film 203. If a photo-curable composition is used as the foreign substance removing material 104, the curing unit 111 irradiates the liquid film 202 with light, thereby forming a cured product film serving as the foreign substance trapping film 203. If a foreign substance 201 is surrounded by the liquid film 202, the foreign substance trapping film 203 trapping the foreign substance 201 is formed. The foreign substance trapping film 203 can have such curing shrinkage that the film is cured in curing. The shrinkage ratio can change depending on the foreign substance removing material 104.

The separation step will be described with reference to FIG. 2D. In the separation step, the plate 103 can be separated from the substrate 102 together with the foreign substance trapping film 203. In an example, the plate 103 is driven by the plate driving mechanism 110 in a direction (+Z direction) to separate from the substrate 102, thereby executing the separation step. A force generated by the plate driving mechanism 110 can be controlled by the controller 117. If the foreign substance trapping film 203 is separated from the substrate 102 in a state in which the foreign substance trapping film 203 trapping the foreign substance 201 is bonded to the film holding region 105, the foreign substance 201 is removed from the substrate 102.

The subsequent foreign substance removing step can be executed in a state in which the foreign substance trapping film 203 is bonded to the film holding region 105 of the plate 103. Hence, a new foreign substance trapping film 203 is deposited on the plate 103 every time the foreign substance removing step is repeated. The number of times of deposition of the foreign substance trapping film 203 on the plate 103 can arbitrarily be decided.

To leave the foreign substance trapping film 203 on the side of the plate 103, an adhesion film is applied to the film holding region 105 of the plate 103 such that the binding force between the plate 103 and the foreign substance trapping film 203 becomes higher than the binding force between the substrate 102 and the foreign substance trapping film 203. This makes it possible to separate the plate 103 from the substrate 102 in a state in which the foreign substance trapping film 203 is bonded to the plate 103. If a plurality of foreign substance trapping films 203 are stacked, a high binding force can generally be obtained because the foreign substance trapping films 203 made of the same foreign substance removing material 104 are bonded.

Note that in the description made with reference to FIGS. 2A to 2D, the application step, the contact step, the curing step, and the separation step have been described as an example of main steps. However, this is merely an example, and another step may be added.

The foreign substance trapping film 203 may be formed by another method. For example, a foreign substance can be trapped using the adhesive force of the foreign substance removing material 104. In this case, in the application step, a film of the foreign substance removing material 104 is formed as the foreign substance trapping film 203 in the film holding region 105 of the plate 103. After that, the foreign substance 201 is trapped in the foreign substance trapping film 203 in the contact step, and the separation step can be executed without performing the curing step.

FIGS. 3A to 3E schematically show a foreign substance removing method according to the first embodiment. First, a procedure of removing a foreign substance on the substrate 102 will exemplarily be described with reference to FIG. 3A. In this example, the whole region of the surface of the substrate 102 is divided into a plurality of regions in accordance with a division grating 300. The size of each element 301 forming the division grating 300 may comply with the size of a shot region (field) defined on the substrate 102 or not. Also, in this example, foreign substance removal is performed in accordance with a step-and-repeat method in which a process of performing the foreign substance removing step for one of the plurality of divided regions, and after the end of the step, executing the foreign substance removing step for the next region is repeated. In this method, the film holding region 105 of the plate 103 can be made smaller than in a method of performing foreign substance removal at once for the whole region of the substrate 102. Hence, a force needed for separating the plate 103 from the substrate 102 can be made small. Also, in this method, since the foreign substance removal region of the substrate 102 can be limited, the foreign substance removing material 104 need not be applied to a region where foreign substance removal is not necessary.

The size of each element 301 of the division grating 300 can be decided based on the X- and Y-direction sizes of the film holding region 105 of the plate 103. The size of each element 301 is preferably slightly smaller than the size of the film holding region 105. In this way, when the center of a foreign substance removal region 302 that is a region on the substrate 102 corresponding to the element 301 is aligned with the center of the film holding region 105, the area of the film holding region 105 is slightly larger than the area of the foreign substance removal region 302. Since the boundary portion of the foreign substance removal region 302 can be a foreign substance removing target, omission of removal of the foreign substance 201 can be suppressed.

The foreign substance removal region 302 can be decided in accordance with, for example, the distribution range of the foreign substances 201 adhered to the substrate 102. The distribution of the foreign substances 201 can be obtained using, for example, a measuring device such as a foreign substance inspection device. Alternatively, the distribution of the foreign substances 201 can be obtained using information obtained in a processing step of a processing apparatus that forms a pattern or a planarization film on the substrate 102, for example, information of an error associated with a foreign substance.

Figure 3A:
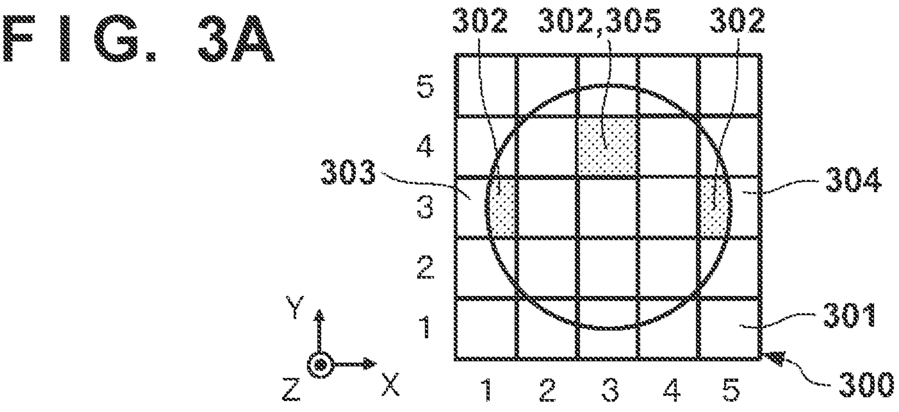
FIGS. 3A to 3E are views schematically showing a foreign substance removing method according to the first embodiment.

In the example shown in FIG. 3A, the division grating 300 is formed by 25 elements 301 arrayed to form five columns in the X direction and five rows in the Y direction. Each element 301 can be specified by specifying a column (X direction) and a row (Y direction) on which it is located. For example, the element 301 located on the first column of the first row can be specified as (X, Y)=(1, 1). Since the elements 301 correspond to regions (foreign substance removal regions 302) different from each other on the substrate 102, droplet control information can be prepared for each element 301. For example, droplet control information for a region (foreign substance removal region 302) including the edge of the substrate 102 can be different from droplet control information for a region (foreign substance removal region 302) not including the edge of the substrate 102. Since the regions (foreign substance removal regions 302) including the edge of the substrate 102 have various shapes, pieces of droplet control information for these can be different from each other.

The Z-direction size (thickness) of the foreign substance trapping film 203 to be formed is decided by the size of the assumed foreign substance 201. In an example, the Z-direction size of the foreign substance trapping film 203 can be decided based on the maximum diameter of the assumed foreign substance 201. The Z-direction size of the foreign substance trapping film 203 may be given commonly to the plurality of elements 301 (or foreign substance removal regions 302), or may be given individually.

The X- and Y-direction sizes of the foreign substance trapping film 203 to be formed can be decided in accordance with the range of overlap of the element 301 and the substrate 102. In an example, the foreign substance trapping film 203 can be formed in a whole region where the element 301 and the substrate 102 overlap. The foreign substance trapping film 203 formed in the film holding region 105 can thus have a common shape, and a plurality of foreign substance trapping films 203 can easily be deposited on the film holding region 105 of the plate 103.

However, if the element 301 overlaps a region including the edge of the substrate 102, the area to form the foreign substance trapping film 203 is smaller than the area of the element 301. If the foreign substance removing step is performed for the foreign substance removal region 302 corresponding to the element 301, the foreign substance trapping film 203 is formed only in a part of the film holding region 105 of the plate 103. For this reason, in the film holding region 105, the height of a region in which the foreign substance trapping film 203 is formed and the height of a region in which the foreign substance trapping film 203 is not formed are different, and a step difference is formed. After that, in a step of forming the foreign substance trapping film 203 in the foreign substance removal region 302 that does not include the edge of the substrate 102, if the film holding region 105 is pressed against the foreign substance removing material 104 via the foreign substance trapping film 203, the pressure to the foreign substance removing material 104 is uneven according to the step difference. In this embodiment, application, supply, or arrangement of the foreign substance removing material 104 to the foreign substance removal region 302 can be controlled such that the outermost surface (the surface exposed to the space) of the foreign substance trapping film 203 formed in the film holding region 105 of the plate 103 is planarized. In an example, the volume of the foreign substance removing material 104 supplied to the foreign substance removal region 302 can be controlled such that the outermost surface of the foreign substance trapping film 203 formed in the film holding region 105 of the plate 103 is planarized. Planarization means increasing a planarity, in other words, reducing deviation from a virtual plane. Control of application, supply, or arrangement of the foreign substance removing material 104 to the foreign substance removal region 302 can be done based on droplet control information obtained by correcting droplet control information prepared in advance. Correction of the droplet control information prepared in advance can include, for example, making the density and/or the volume of droplets of the foreign substance removing material 104 to be arranged in a portion where the thickness of the foreign substance trapping film 203 should locally be larger than in other portions larger than in other portions.

When the shape (the sizes in the X-, Y-, and Z-directions) of the foreign substance trapping film 203 to be formed in each region (foreign substance removal region 302) on the substrate 102 is decided, droplet control information is generated in accordance with this. Note that since the foreign substance trapping film 203 is formed by curing the liquid film 202 made of the foreign substance removing material 104, and shrinkage occurs at the time of curing, as described above, droplet control information may be generated in consideration of the influence of this.

In the example shown in FIG. 3A, of the plurality of elements 301 of the division grating 300, the elements 301 that overlap the foreign substance removal regions 302 are three elements at (X, Y)=(1, 3), (5, 3), and (3, 4). The element 301 at (X, Y)=(1, 3) is defined as an element A (303), the element 301 at (X, Y)=(5, 3) is defined as an element B (304), and the element 301 at (X, Y)=(3, 4) is defined as an element C (305). In this example, a description will be made assuming that foreign substance removal is performed in the order of the foreign substance removal region 302 corresponding to the element A (303), the foreign substance removal region 302 corresponding to the element B (304), and the foreign substance removal region 302 corresponding to the element C (305).

Figure 3B:
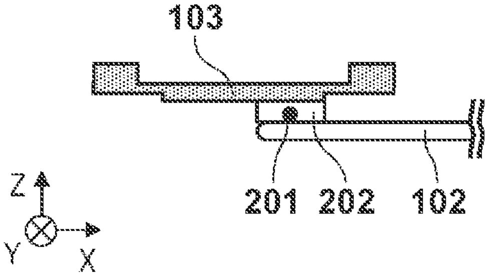

Formation of the foreign substance trapping film 203 for the foreign substance removal region 302 corresponding to the element A (303) (that is, the foreign substance removing step) will be described with reference to FIG. 3B. In this example, the plate 103 that is unused at this point of time is used. That is, the foreign substance trapping film 203 does not exist in the film holding region 105 of the plate 103. To determine whether the thickness (volume) of the foreign substance trapping film 203 to be formed in the foreign substance removal region 302 corresponding to the element A (303) needs to be adjusted, the controller 117 acquires shape information indicating the shape of the surface of the film holding region 105. The shape information may be acquired by actually measuring the foreign substance trapping film 203 or may be acquired based on droplet control information stored in the controller 117. The droplet control information includes the amount of one droplet of the foreign substance removing material 104 and the application position (the x-coordinate and the y-coordinate) on the substrate 102 (region). Hence, if the foreign substance trapping film 203 exists on the surface of the film holding region 105, the controller 117 can calculate the shape information based on the droplet control information used to generate it. Here, since the plate 103 is unused, adjustment of the thickness (volume) of the foreign substance trapping film 203 to be formed in the foreign substance removal region 302 corresponding to the element A (303) is unnecessary. Hence, the controller 117 uses droplet control information prepared in advance for the element A (303). The droplet control information used to form the foreign substance trapping film 203 in the foreign substance removal region 302 corresponding to the element A (303) is defined as droplet control information A.

Since the element A (303) overlaps a region including the edge of the substrate 102, a region that does not overlap the substrate 102 exists in the region of the element A (303). Hence, when performing the foreign substance removing step for the foreign substance removal region 302 corresponding to the element A (303), the foreign substance trapping film 203 is formed as a foreign substance trapping film A (306) only in a part of the film holding region 105. The thickness (Z-direction size) of the foreign substance trapping film A (306) is defined as TA.

Figure 3C:
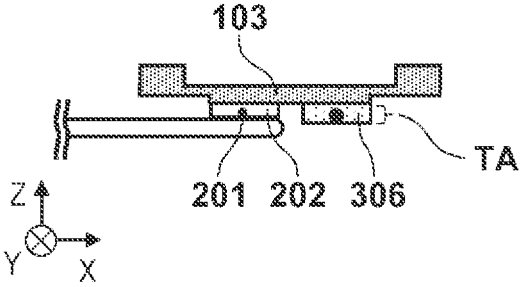

Formation of the foreign substance trapping film 203 for the foreign substance removal region 302 corresponding to the element B (304) (that is, the foreign substance removing step) will be described with reference to FIG. 3C. To determine whether the thickness (volume) of the foreign substance trapping film 203 to be formed in the foreign substance removal region 302 corresponding to the element B (304) needs to be adjusted, the controller 117 acquires shape information indicating the shapes of the surfaces of the film holding region 105 and the foreign substance trapping film A (306) held by this. The controller 117 can acquire or calculate the shapes of the surfaces of the film holding region 105 and the foreign substance trapping film A (306) held by this based on the droplet control information A used to form the foreign substance trapping film A (306). More specifically, based on the droplet control information A, the controller 117 can specify that the foreign substance trapping film A (306) is arranged in a partial region of the film holding region 105 and has the thickness TA. This indicates that a step difference exists between the surface of the film holding region 105 and the surface of the foreign substance trapping film A (306) held by this.

The droplet control information used to form the foreign substance trapping film 203 in the foreign substance removal region 302 corresponding to the element B (304) is defined as droplet control information B. The controller 117 can specify the foreign substance removal region 302 (the region where the foreign substance trapping film 203 is to be formed) corresponding to the element B (304) based on the droplet control information B. Also, based on the droplet control information A and the droplet control information B, the controller 117 can determine that the foreign substance trapping film 203 does not exist yet in the region where the foreign substance trapping film 203 is to be formed newly in the film holding region 105. Hence, the controller 117 can determine that adjustment of the thickness (volume) of the foreign substance trapping film 203 to be formed in the foreign substance removal region 302 corresponding to the element B (304) is unnecessary. Hence, the controller 117 uses the droplet control information B prepared in advance for the element B (304).

Since the element B (304) overlaps a region including the edge of the substrate 102, a region that does not overlap the substrate 102 exists in the region of the element B (304). Hence, when performing the foreign substance removing step for the foreign substance removal region 302 corresponding to the element B (304), the foreign substance trapping film 203 is formed as a foreign substance trapping film B (307) only in a part of the film holding region 105. The thickness (Z-direction size) of the foreign substance trapping film B (307) is defined as TB. TB=TA may hold, but TA>TB is set here to explain an example in which TB is different from TA. Note that if TB=TA, a process associated with TA>TB is omitted in the following description.

Figure 3D:
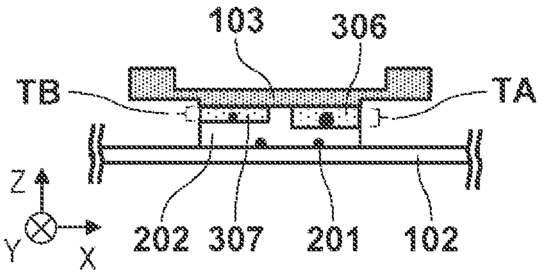

Formation of the foreign substance trapping film 203 for the foreign substance removal region 302 corresponding to the element C (305) (that is, the foreign substance removing step) will be described with reference to FIG. 3D. To determine the necessity of adjustment of the thickness (volume) of the foreign substance trapping film 203 to be formed in the foreign substance removal region 302 corresponding to the element C (305), the controller 117 acquires shape information indicating the surface shapes of the film holding region 105 and the foreign substance trapping films A (306) and B (307) held by this. The controller 117 can acquire or calculate the shapes of the surfaces of the film holding region 105 and the foreign substance trapping films A (306) and B (307) held by this based on the droplet control information A and B used to form the foreign substance trapping films A (306) and B (307). More specifically, based on the droplet control information A, the controller 117 can specify that the foreign substance trapping film A (306) is arranged in a partial region of the film holding region 105 and has the thickness TA. In addition, based on the droplet control information B, the controller 117 can specify that the foreign substance trapping film B (307) is arranged in a partial region of the film holding region 105 and has the thickness TB. This indicates that step differences exist between the surface of the film holding region 105 and the surfaces of the foreign substance trapping films A (306) and B (307) held by this.

The droplet control information used to form the foreign substance trapping film 203 in the foreign substance removal region 302 corresponding to the element C (305) is defined as droplet control information C. The controller 117 can specify the foreign substance removal region 302 (the region where the foreign substance trapping film 203 is to be formed) corresponding to the element C (305) based on the droplet control information C. The foreign substance removal region 302 corresponding to the element C (305) is the whole region of the element C (305), and the thickness of the foreign substance trapping film 203 formed there is defined as TC. Based on the droplet control information A, the droplet control information B, and the droplet control information C, the controller 117 can determine that the region where the foreign substance trapping film 203 is to be formed newly in the film holding region 105 includes the regions where the foreign substance trapping films A (306) and B (307) exist. Hence, the controller 117 determines that the droplet control information C prepared in advance for the element C (305) needs to be corrected, that is, the thickness of the foreign substance trapping film 203 to be formed newly needs to be adjusted to planarize the surface of the foreign substance trapping film 203 to be formed newly.

In this example, since TA>TB, the surface most projecting from the surface of the film holding region 105 is the surface of the foreign substance trapping film A (306). In an example, the controller 117 sets the surface of the foreign substance trapping film A (306) to a reference surface, and does not adjust the thickness of the foreign substance trapping film 203 for the reference surface.

The next surface projecting from the surface of the film holding region 105 is the surface of the foreign substance trapping film B (307). In an example, the controller 117 performs adjustment corresponding to the difference from the reference surface, that is, a thickness (TA−TB). More specifically, the controller 117 performs thickness adjustment corresponding to (TA−TB) for the surface of the foreign substance trapping film B (307). That is, for the region where the foreign substance trapping film B (307) exists, the controller 117 sets the thickness of the foreign substance trapping film 203 to be formed newly to (TA−TB)+TC.

Also, since the difference between the reference surface and the surface of the film holding region 105 is TA, the controller 117 performs thickness adjustment corresponding to TA for the surface of the film holding region 105 where neither of the foreign substance trapping films A (306) and B (307) exists. That is, for the surface of the film holding region 105 where neither of the foreign substance trapping films A (306) and B (307) exists, the controller 117 sets the thickness of the foreign substance trapping film 203 to be formed newly to (TA+TC).

The controller 117 corrects the droplet control information C such that the above-described conditions are satisfied, thereby generating droplet control information C'. This correction can include, for example, making the density and/or the volume of droplets of the foreign substance removing material 104 to be arranged in a portion where the thickness of the foreign substance trapping film 203 should locally be larger than in other portions larger than in other portions. After the foreign substance removing material 104 is applied to the foreign substance removal region 302 corresponding to the element C (305) based on the thus generated droplet control information C', the plate 103 is pressed against the foreign substance removing material 104 via the foreign substance trapping films A (306) and B (307). After that, the liquid film 202 formed by the foreign substance removing material 104 is cured, and the foreign substance trapping film 203 is formed as a foreign substance trapping film C (308). As described above, the thickness of the foreign substance trapping film C (308) to be formed newly is adjusted to planarize the surface of the foreign substance trapping film C (308) to be formed newly.

Figure 3E:
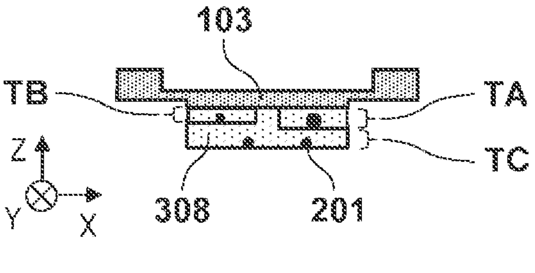

FIG. 3E schematically shows the foreign substance trapping films A (306), B (307), and C (308) deposited on the plate 103 immediately after the foreign substance removing step for the foreign substance removal region 302 corresponding to the element C (305) is ended. Ideally, the foreign substance trapping film C (308) has a flat surface, and at least, the foreign substance trapping film C (308) has a surface planarized by the foreign substance trapping film C (308). The surface planarized by the foreign substance trapping film C (308) is a surface flatter than a surface formed by a structure formed by the plate 103 and the foreign substance trapping films A (306) and B (307) in a case where the foreign substance trapping film C (308) does not exist.

Ideally, the structure formed by the foreign substance trapping films A (306), B (307), and C (308) deposited on the plate 103 has an even thickness (TA+TC), and at least the structure has a planarized surface. Hence, in the next foreign substance removing step, the plate 103 can be pressed against the foreign substance removing material 104 on the substrate 102 by an even force via the foreign substance trapping film C (308). Also, in the next foreign substance removing step, adjustment of the thickness of the foreign substance removing material 104 for foreign substance trapping film formation is unnecessary.

Note that like the foreign substance removing step for the foreign substance removal regions 302 corresponding to the elements A and B, if the foreign substance removing step of forming the foreign substance trapping film 203 only in a part of the film holding region 105 is continuously repeated, the surface shape of the structure formed by the plurality of deposited foreign substance trapping films may be complex. Hence, it is advantageous to execute the foreign substance removing step for the foreign substance removal region 302 corresponding to the element C between the foreign substance removing step for the foreign substance removal region 302 corresponding to the element A and the foreign substance removing step for the foreign substance removal region 302 corresponding to the element B. In other words, if the substrate 102 includes a first region and a second region larger than the first region, it is advantageous to execute a second foreign substance removing step for the second region after a first foreign substance removing step for the first region. Furthermore, if the substrate 102 includes a third region smaller than the second region, and a fourth region larger than the third region, it is advantageous to execute a third foreign substance removing step for the third region after the second foreign substance removing step and then execute a fourth foreign substance removing step for the third region.

To summarize the above disclosed matters, a foreign substance removing method for removing a foreign substance on a substrate can include a first step, and a second step to be executed after the first step. In the first step, a first foreign substance trapping film is formed between a plate and the first region (the first region where a foreign substance should be removed) of the substrate, and the plate can be separated from the first region together with the first foreign substance trapping film. In the second step, a second foreign substance trapping film is formed between the plate that holds the first foreign substance trapping film and the second region (the second region where a foreign substance should be removed) of the substrate, and the plate can be separated from the second region together with the first foreign substance trapping film and the second foreign substance trapping film. Here, the second region can be a region larger than the first region. A value obtained by dividing the volume of the second foreign substance trapping film by the area of the second region is a value larger than a value obtained by dividing the volume of the first foreign substance trapping film by the area of the first region. Hence, a non-flat surface that may be formed on the surface of the plate can be planarized by forming the first foreign substance trapping film. In other words, the outermost surface of the second foreign substance trapping film has a planarity higher than an outermost surface formed by the surface of the plate and the surface of the first foreign substance trapping film. The volume of the second foreign substance trapping film can be decided in accordance with the volume of the first foreign substance trapping film.

In the first step, after a first liquid film is formed between the plate and the first region, the first liquid film is cured, thereby forming the first foreign substance trapping film. In the second step, after a second liquid film is formed between the plate and the second region, the second liquid film is cured, thereby forming the second foreign substance trapping film. The foreign substance removing method may further include a third step performed before the second step. In the third step, a third foreign substance trapping film is formed between the plate and a third region where a foreign substance should be removed, and the plate can be separated from the third region together with the third foreign substance trapping film. The second region is larger than the third region.

The first step and the second step may be executed after the existence of a first foreign substance on the first region and the existence of a second foreign substance on the second region are specified. In this case, in the first step, after the first liquid film is formed between the plate and the first region to trap the first foreign substance on the first region, the first liquid film is cured, thereby forming the first foreign substance trapping film. Also, in the second step, after the second liquid film is formed between the plate and the second region to trap the second foreign substance on the second region, the second liquid film is cured, thereby forming the second foreign substance trapping film.

In the first step, a plurality of first droplets are arranged on the first region, and the plurality of first droplets and the plate are brought into contact with each other, thereby forming the first liquid film. In the second step, a plurality of second droplets are arranged on the second region, and the plurality of second droplets and the plate that holds the first foreign substance trapping film are brought into contact with each other, thereby forming the second liquid film.

The arrangement of the plurality of second droplets can be decided in accordance with droplet control information that controls the arrangement of the plurality of first droplets. The arrangement of the plurality of second droplets can be decided in accordance with the surface shape of the first foreign substance trapping film. The arrangement of the plurality of second droplets can be decided in accordance with the position of the first foreign substance trapping film on the plate and the surface shape of the first foreign substance trapping film.

Figure 7A:
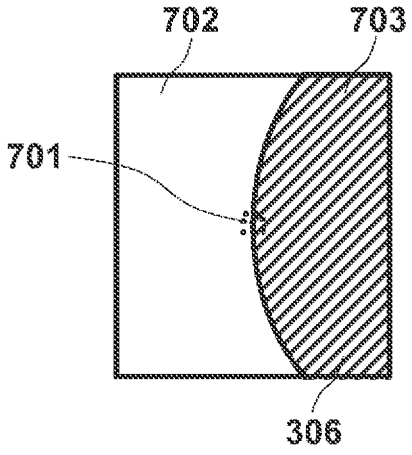
FIGS. 7A to 7C are views exemplarily showing a method of deciding the thickness of a foreign substance trapping film.

A method of deciding the thickness of the foreign substance trapping film will be described below with reference to FIGS. 7A to 7C. A description here corresponds to, in the example shown in FIGS. 3A to 3E, a process of, after removing a foreign substance in the foreign substance removal region corresponding to the element A (303), removing a foreign substance in the foreign substance removal region corresponding to the element C (305) without removing a foreign substance in the foreign substance removal region corresponding to the element B (304). FIG. 7A corresponds to a view showing the substrate 102 viewed through the film holding region 105.

Here, in the example shown in FIGS. 3A to 3E, by the foreign substance removing step for the foreign substance removal region corresponding to the element A (303) of the division grating 300, the residual film A (303) having the thickness TA is formed in the film holding region 105. The area of the element C (305) is larger than the area of the element A (303). That is, the foreign substance trapping film C (308) remaining in the film holding region 105 after the foreign substance removing step for the foreign substance removal region corresponding to the element C (305) is larger than the foreign substance trapping film A (306) remaining in the film holding region 105 after the foreign substance removing step for the foreign substance removal region corresponding to the element A (303). In this case, the thickness of the foreign substance trapping film C (308) formed in the foreign substance removing step for the foreign substance removal region corresponding to the element C (305) needs to be adjusted. Since the foreign substance removing step for the foreign substance removal region corresponding to the element A (303) is the first foreign substance removing step, there is no foreign substance trapping film remaining in the film holding region 105. Hence, in the foreign substance removing step for the foreign substance removal region corresponding to the element A (303), the arrangement of droplets for forming the foreign substance trapping film A (306) is decided by the uncorrected droplet control information A. That is, the size of the foreign substance trapping film A (306) formed in the foreign substance removal region corresponding to the element A (303) is decided by the arrangement of droplets according to the uncorrected droplet control information A. Here, the volume of the foreign substance trapping film A (306) is decided by a total volume VA of a plurality of droplets arranged in accordance with the uncorrected droplet control information A. In addition, an area AA of the foreign substance trapping film A (306) is decided by the area of a liquid film formed by the plurality of droplets arranged in accordance with the droplet control information A. Hence, the thickness TA of the foreign substance trapping film A (306) is decided by a value obtained by dividing the total volume VA by the area AA. In other words, the droplet control information A defines the arrangement of droplets such that the volume of the foreign substance trapping film A (306), with which the foreign substance trapping film A (306) obtains the thickness TA, is decided.

Next, the foreign substance removing step of removing a foreign substance in the foreign substance removal region corresponding to the element C (305) is executed. In the overlap between the element C (305) and the film holding region 105, a portion in which the foreign substance trapping film A (306) does not exist is defined as a first portion 702, and a portion in which the foreign substance trapping film A (306) exists is defined as a second portion 703. The thickness of the foreign substance trapping film C (308) formed in the film holding region 105 in the foreign substance removing step for the foreign substance removal region corresponding to the element C (305) is decided by the arrangement of a plurality of droplets defined by the corrected droplet control information C'. More specifically, in the first portion 702, the thickness of the foreign substance trapping film C (308) can be decided as (TA+TC) in consideration of the thickness TA of the foreign substance trapping film A (306) existing in the second portion 703. In the second portion 703, the thickness of the foreign substance trapping film C (308) can be decided as TC in consideration of the thickness TA of the foreign substance trapping film A (306) existing in the second portion 703. Then, the volume of the foreign substance trapping film C (308) is decided such that the thickness (TA+TC) in the first portion 702 and the thickness TC in the second portion 703 are satisfied. In other words, the volume and the arrangement of the plurality of droplets can be decided such that the thickness (TA+TC) in the first portion 702 and the thickness TC in the second portion 703 are satisfied.

In FIG. 7A, a small region 701 schematically indicates a small region on the edge of the foreign substance trapping film A (306) in the film holding region 105. FIG. 7B exemplarily shows in the foreign substance removing step of forming the foreign substance trapping film C (308), generating the droplet control information C' to make the density of droplets of the foreign substance removing material 104 arranged in the first portion 702 higher than the density of droplets of the foreign substance removing material 104 arranged in the second portion 703. On the other hand, FIG. 7C exemplarily shows in the foreign substance removing step of forming the foreign substance trapping film C (308), generating the droplet control information C' to make the volume of droplets of the foreign substance removing material 104 arranged in the first portion 702 larger than the volume of droplets of the foreign substance removing material 104 arranged in the second portion 703.

Figure 7B:
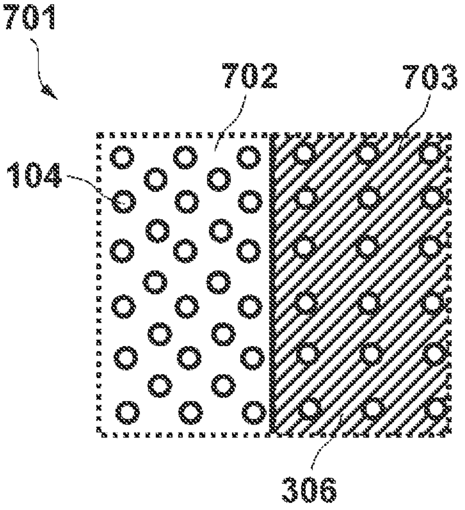
Figure 7C:
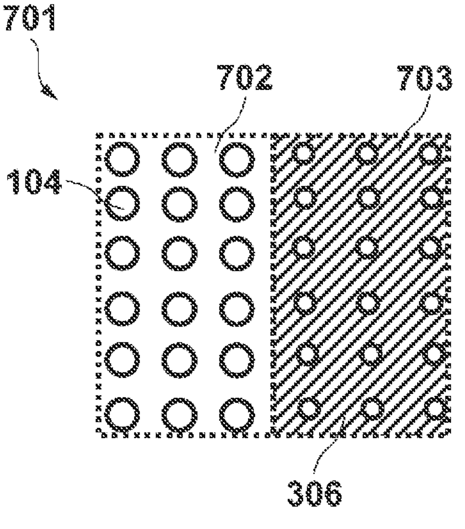

Two methods are exemplarily shown in FIGS. 7B and 7C. The thickness (thickness distribution) of the foreign substance trapping film may be adjusted by adjusting the volume of the foreign substance trapping film by combining the adjustment of the density of droplets and the adjustment of the volume of droplets.

Note that if a photocuring method is employed, the foreign substance trapping film shrinks due to photocuring. A shrinkage ratio indicating the degree of shrinkage is called a curing shrinkage coefficient. If there is a need to control the planarity of the surface of the foreign substance trapping film deposited in the film holding region of the plate at higher accuracy, the volume and the arrangement of droplets can be decided in consideration of the curing shrinkage coefficient as well.

Figure 4:
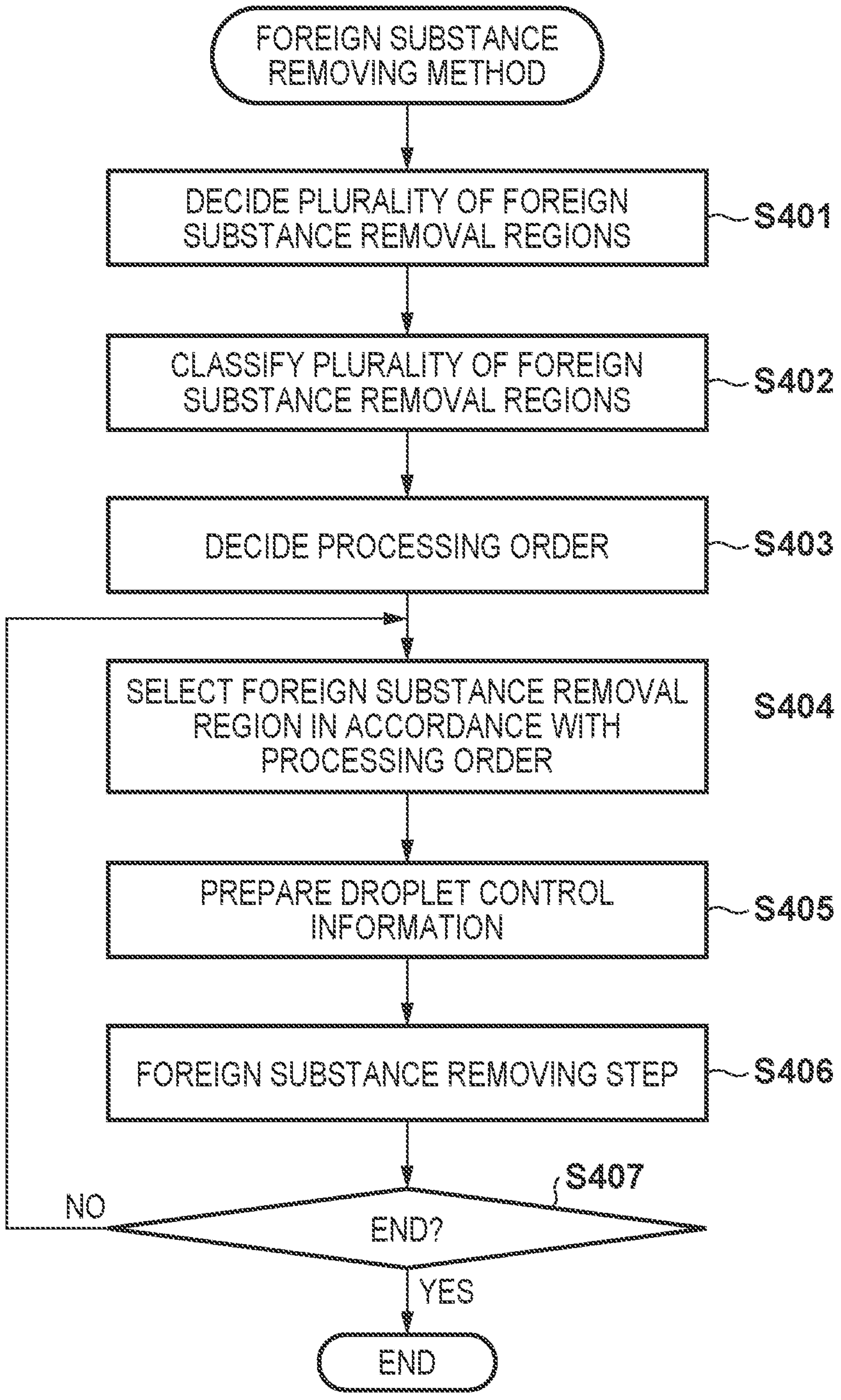
FIG. 4 is a flowchart schematically showing the procedure of the foreign substance removing method according to the first embodiment.

FIG. 4 exemplarily shows the operation of the foreign substance removing apparatus 100. This operation may be understood as a foreign substance removing method. This operation can be controlled by the controller 117. A description will be made here assuming that the substrate 102 that is a foreign substance removing target is already loaded into the foreign substance removing apparatus 100 and held by the substrate holder 106.

In step S401, the controller 117 divides the whole region (or a region where foreign substances should be removed) of the surface of the substrate 102 into a plurality of foreign substance removal regions in accordance with the above-described division grid 300. Here, if foreign substances on the surface of the substrate 102 are inspected in advance, and portions where foreign substances exist are specified, foreign substance removal regions including the portions with foreign substances may be extracted for subsequent processes.

In step S402, the controller 117 compares each of the sizes (areas) of the plurality of foreign substance removal regions with a predetermined threshold, thereby classifying the plurality of foreign substance removal regions into two or more groups. In an example, the controller 117 compares each of the sizes (areas) of the plurality of foreign substance removal regions with a predetermined threshold, thereby classifying the plurality of foreign substance removal regions into two groups. In this case, the first group is a group whose size is defined by the edge of the substrate 102, and the second group is a group whose size is not defined by the edge of the substrate 102, typically a group having a rectangular shape. The size (area) of the second group is larger than the size (area) of the first group.

In step S403, the controller 117 decides the execution order of the foreign substance removing step for the plurality of foreign substance removal regions based on the result of the classification in step S402. The execution order is preferably decided such that a process of executing the foreign substance removing step for the first group in which the size (area) of the foreign substance removal region is smaller than the threshold, and next, executing the foreign substance removing step for the second group in which the size (area) of the foreign substance removal region is larger than the threshold is repeated. In another viewpoint, the execution order is preferably decided such that the foreign substance removing step for the second group is executed between the foreign substance removing step for the first group and the foreign substance removing step for the first group. In still another viewpoint, the execution order is preferably decided such that the foreign substance removing step for the first group is executed between the foreign substance removing step for the second group and the foreign substance removing step for the second group.

In step S404, in accordance with the execution order decided in step S403, the controller 117 selects one foreign substance removal region from the foreign substance removal regions to be processed. In step S405, the controller 117 prepares droplet control information corresponding to the foreign substance removal region selected in step S404. Here, droplet control information for a foreign substance removal region of the first group is not corrected, and droplet control information for a foreign substance removal region of the second group is corrected. Correction of the droplet control information can be done such that the foreign substance trapping film formed by the droplets arranged on the foreign substance removal region in accordance with the corrected droplet control information and held by the film holding region 105 of the plate 103 has a planarized surface.

In step S406, the controller 117 executes, based on the droplet control information prepared in step S405, the foreign substance removing step for the foreign substance removal region selected in step S404. The foreign substance removing step can include, as described above, the application step of applying the droplets of the foreign substance removing material 104 to the foreign substance removal region based on the droplet control information, and the contact step, the curing step, and the separation step after that.

In step S407, the controller 117 determines whether an unprocessed foreign substance removal region exists. If an unprocessed foreign substance removal region exists, the process is repeated from step S404; otherwise, the process concerning foreign substance removal is ended.

Second Embodiment

The second embodiment of the present disclosure will be described below. Matters that are not mentioned as the second embodiment can comply with the first embodiment. In the second embodiment, the size of a foreign substance removal region, that is, the application range of droplets of a foreign substance removing material 104 is intentionally reduced. In the first embodiment, the area where the element 301 of the division grating 300 and the substrate 102 overlap is defined as a foreign substance removal region, and droplets of the foreign substance removing material 104 are applied. On the other hand, in the second embodiment, the size of the area to remove a foreign substance can be decided in accordance with another condition. For example, in a case where foreign substance inspection is executed in advance, since a portion or a range where a foreign substance exists is specified, the size of the foreign substance removal region can be decided in accordance with the specification. Making the foreign substance removal region small is advantageous in reducing a force for separating a foreign substance trapping film from the substrate in the separation step. Reducing the force is advantageous in reducing breakage of the substrate.

FIGS. 5A to 5D schematically show a foreign substance removing method according to the second embodiment. The foreign substance removing method according to the second embodiment will be described below with reference to FIG. 4 and FIGS. 5A to 5D. In step S401, a controller 117 sets a plurality of foreign substance removal regions. In step S402, the controller 117 compares each of the sizes (areas) of the plurality of foreign substance removal regions with a predetermined threshold, thereby classifying the plurality of foreign substance removal regions into two or more groups. In an example, the controller 117 compares each of the sizes (areas) of the plurality of foreign substance removal regions with a predetermined threshold, thereby classifying the plurality of foreign substance removal regions into two groups. The first group is a group having a smaller size than the second group, as exemplarily shown as a foreign substance removal region 501 in FIG. 5A. The second group is a group having a larger size than the first group, as exemplarily shown as a foreign substance removal region 502 in FIG. 5A. More specifically, the second group is a group having the same size as a film holding region 105 of a plate 103.

Figure 5A:
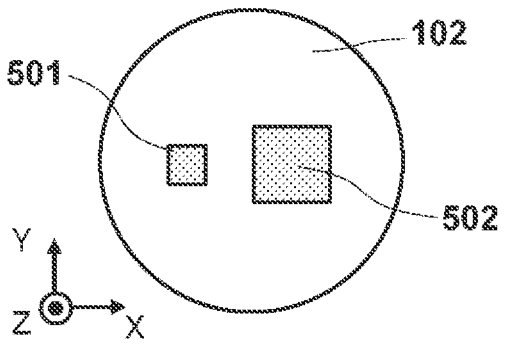
FIGS. 5A to 5D are views schematically showing a foreign substance removing method according to the second embodiment.
Figure 5B:
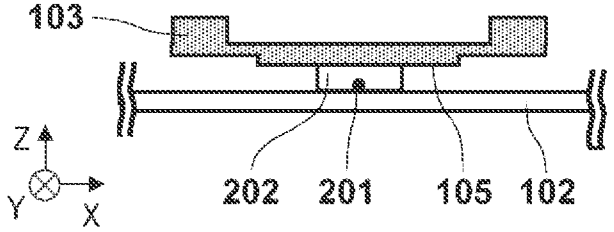
Figure 5C:
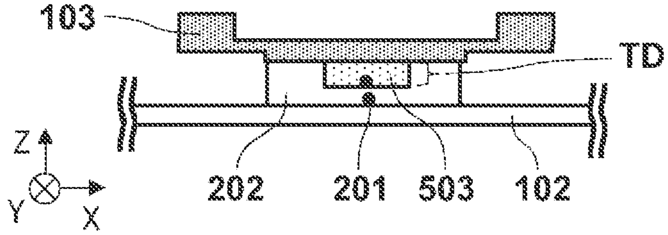
Figure 5D:
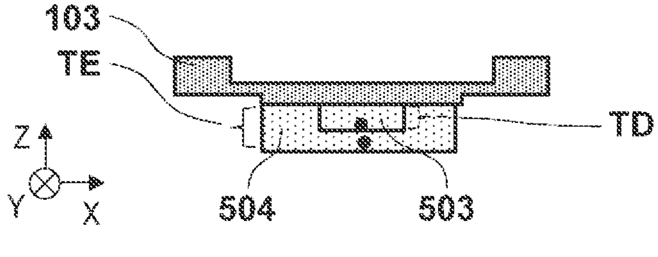

Steps S403 to S407 are the same as in the first embodiment. FIG. 5B schematically shows a foreign substance removing step for the foreign substance removal region 501 classified into the first group. FIG. 5C schematically shows a foreign substance removing step for the foreign substance removal region 502 classified into the second group. FIG. 5D schematically shows a state in which the foreign substance removing step for the foreign substance removal region 502 classified into the second group is ended.

In the foreign substance removing step for the foreign substance removal region 502 classified into the second group, a foreign substance trapping film 503 held by the film holding region 105 of the plate 103 already exists, and therefore, a step difference generated by a thickness TD of the foreign substance trapping film 503 needs to be taken into consideration. Hence, the volume of a foreign substance trapping film 504 is decided such that a thickness TE is added to a range where the foreign substance trapping film 503 exists, and a thickness (TD+TE) is added to a range where the foreign substance trapping film 503 does not exist, and the foreign substance trapping film 504 is formed in accordance with the volume. Thus, the foreign substance trapping film 504 having a planarized surface can be formed, as schematically shown in FIG. 5D.

Third Embodiment

The third embodiment of the present disclosure will be described below. Matters that are not mentioned as the third embodiment can comply with the first embodiment. In the third embodiment, a substrate having at least two types of sizes is set to a foreign substance removing target, and foreign substance removal regions having at least two types of sizes are thus provided. The third embodiment is suitable for removing foreign substances at once from the whole region of the surface of the substrate.

The outer diameters of substrates are defined by a standard, and there exist a plurality of types. A foreign substance removing apparatus 100 is designed assuming the maximum outer diameter of substrates that are foreign substance removing targets. However, if a substrate is smaller than the maximum outer diameter, it can be handled by the foreign substance removing apparatus 100 because a film holding region 105 is larger than the substrate.

Figure 6A:
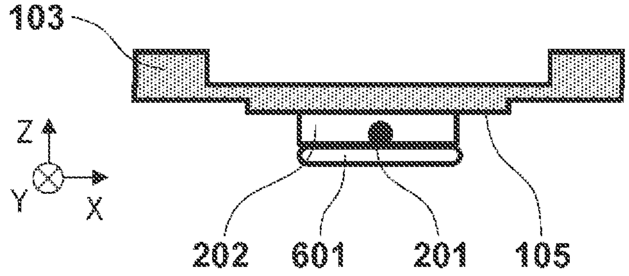
FIGS. 6A to 6C are views schematically showing a foreign substance removing method according to the third embodiment.
Figure 6B:
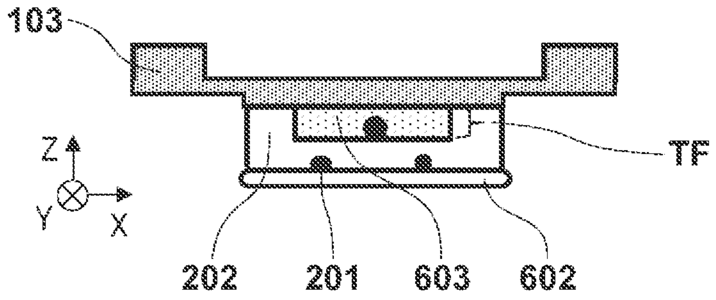
Figure 6C:
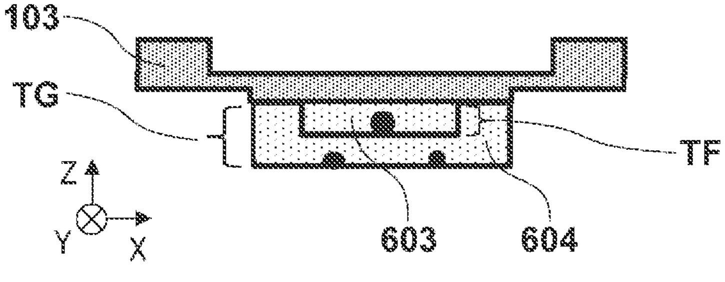

FIGS. 6A to 6C schematically show a foreign substance removing method according to the third embodiment. The foreign substance removing method according to the third embodiment will be described below with reference to FIG. 4 and FIGS. 6A to 6C. In steps S401 and S402, a controller 117 divides a plurality of substrates into two or more groups based on the sizes (outer diameters) of the substrates. In an example, the controller 117 divides a plurality of substrates into two groups based on the sizes (outer diameters) of the substrates. In this case, the first group is a group of substrates having an outer diameter smaller than the maximum outer diameter that the foreign substance removing apparatus 100 can handle, and the second group is a group of substrates having the maximum outer diameter that the foreign substance removing apparatus 100 can handle. In this example, a substrate B (602) is a substrate having the maximum outer diameter that the foreign substance removing apparatus 100 can handle, and a substrate A (601) is a substrate having an outer diameter smaller than the substrate B (602). As described above, since the outer diameters of substrates are defined by a standard, the controller 117 can classify substrates into groups in accordance with a type concerning the outer diameter of each substrate. The foreign substance removal region of a substrate of the second group is larger than the foreign substance removal region of a substrate of the first group.

In step S403, the controller 117 decides the execution order of the foreign substance removing step for the plurality of substrates (foreign substance removal regions) based on the result of the classification in steps S401 and S402. The execution order is preferably decided such that a process of executing the foreign substance removing step for the first group in which the size (or the outer diameter) of the foreign substance removal region is small, and next, executing the foreign substance removing step for the second group in which the size (or the outer diameter) of the foreign substance removal region is large is repeated. In another viewpoint, the execution order is preferably decided such that the foreign substance removing step for the second group is executed between the foreign substance removing step for the first group and the foreign substance removing step for the first group. In still another viewpoint, the execution order is preferably decided such that the foreign substance removing step for the first group is executed between the foreign substance removing step for the second group and the foreign substance removing step for the second group.

Steps S403 to S407 are the same as in the first embodiment. FIG. 6A schematically shows a foreign substance removing step for the substrate A (601) classified into the first group. FIG. 6B schematically shows a foreign substance removing step for the substrate B (602) classified into the second group. FIG. 6C schematically shows a state in which the foreign substance removing step for the substrate B (602) classified into the second group is ended.

In the foreign substance removing step for the substrate B (602) classified into the second group, a foreign substance trapping film 603 held by the film holding region 105 of a plate 103 already exists, and therefore, a step difference generated by a thickness TF of the foreign substance trapping film 603 needs to be taken into consideration. Hence, the volume of a foreign substance trapping film 604 is decided such that a thickness TG is added to a range where the foreign substance trapping film 603 exists, and a thickness (TF+TG) is added to a range where the foreign substance trapping film 603 does not exist, and the foreign substance trapping film 604 is formed in accordance with the volume. Thus, the foreign substance trapping film 604 having a planarized surface can be formed, as schematically shown in FIG. 6C.

Fourth Embodiment

The fourth embodiment of the present disclosure will be described below. The fourth embodiment is related to a film forming method and an article manufacturing method including a foreign substance removing method exemplified as the first to third embodiments.

The film forming method according to the fourth embodiment includes a foreign substance removing step of removing a foreign substance on a substrate in accordance with a foreign substance removing method exemplified as a foreign substance removing method exemplified as the first to third embodiments, and a film forming step of forming a film on the substrate that has undergone the foreign substance removing step. The film forming step can include, for example, a step of forming a film having a pattern on the substrate using a lithography apparatus such as an imprint apparatus or a projection exposure apparatus. Alternatively, the film forming step can include, for example, a step of forming a planarized film on the substrate using a planarization apparatus. The planarization apparatus can be configured to, for example, arrange a curable composition on the substrate, bring a superstrate into contact with the curable composition, cure the curable composition, and then separate the superstrate from the cured product of the curable composition.

The article manufacturing method according to the fourth embodiment includes a foreign substance removing step of removing a foreign substance on a substrate in accordance with a foreign substance removing method exemplified as a foreign substance removing method exemplified as the first to third embodiments, a film forming step of forming a film on the substrate that has undergone the foreign substance removing step, and a processing step of processing the substrate that has undergone the film forming step, thereby obtaining an article. The processing step can include, for example, an etching step, a film deposition step, a dicing step, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-048613, filed Mar. 24, 2023 which is hereby incorporated by reference herein in its entirety.

What is claimed is:

1. A foreign substance removing method for removing a foreign substance, comprising:

forming a first foreign substance trapping film between a plate and a first region where a foreign substance should be removed and separating the plate from the first region together with the first foreign substance trapping film; and after the forming the first foreign substance trapping film, forming a second foreign substance trapping film between the plate that holds the first foreign substance trapping film and a second region where a foreign substance should be removed, and separating the plate from the second region together with the first foreign substance trapping film and the second foreign substance trapping film, wherein the second region is larger than the first region, and a value obtained by dividing a volume of the second foreign substance trapping film by an area of the second region is larger than a value obtained by dividing a volume of the first foreign substance trapping film by an area of the first region, and wherein the volume of the second foreign substance trapping film is determined based on the volume of the first foreign substance trapping film, so as to compensate for a surface shape formed by the plate and the first foreign substance trapping film.

2. The method according to claim 1, wherein in the forming the first foreign substance trapping film, after a first liquid film is formed between the plate and the first region, the first liquid film is cured, thereby forming the first foreign substance trapping film, and in the forming the second foreign substance trapping film, after a second liquid film is formed between the plate and the second region, the second liquid film is cured, thereby forming the second foreign substance trapping film.

3. The method according to claim 2, wherein in the forming the first foreign substance trapping film, after the first liquid film is formed between the plate and the first region to trap a first foreign substance on the first region, the first liquid film is cured, thereby forming the first foreign substance trapping film, and in the forming the second foreign substance trapping film, after the second liquid film is formed between the plate and the second region to trap a second foreign substance on the second region, the second liquid film is cured, thereby forming the second foreign substance trapping film.

4. The method according to claim 2, wherein in the forming the first foreign substance trapping film, a plurality of first droplets are arranged on the first region, and the plurality of first droplets and the plate are brought into contact with each other, thereby forming the first liquid film, and in the forming the second foreign substance trapping film, a plurality of second droplets are arranged on the second region, and the plurality of second droplets and the plate that holds the first foreign substance trapping film are brought into contact with each other, thereby forming the second liquid film.

5. The method according to claim 4, wherein an arrangement of the plurality of second droplets is decided in accordance with droplet control information that controls an arrangement of the plurality of first droplets.

6. The method according to claim 4, wherein an arrangement of the plurality of second droplets is decided in accordance with a surface shape of the first foreign substance trapping film.

7. The method according to claim 4, wherein an arrangement of the plurality of second droplets is decided in accordance with a position of the first foreign substance trapping film on the plate and a surface shape of the first foreign substance trapping film.

8. The method according to claim 1, wherein the first region is a region on a surface of a substrate, and the second region is a region on the surface of the substrate.

9. The method according to claim 1, further comprising, before the forming the second foreign substance trapping film, forming a third foreign substance trapping film between the plate and a third region where a foreign substance should be removed, and separating the plate from the third region together with the third foreign substance trapping film, wherein the second region is larger than the third region.

10. The method according to claim 9, wherein the third region is a region different from the first region.

11. The method according to claim 1, wherein the first region is a region on a surface of a substrate, and the second region is a region on a surface of a substrate different from the substrate.

12. The method according to claim 1, wherein an outermost surface of the second foreign substance trapping film has a planarity higher than an outermost surface formed by a surface of the plate and a surface of the first foreign substance trapping film.

13. A film forming method comprising:

removing a foreign substance on a substrate in accordance with a foreign substance removing method defined in claim 1; and forming a film on the substrate that has undergone the removing the foreign substance.

14. An article manufacturing method comprising:

removing a foreign substance on a substrate in accordance with a foreign substance removing method defined in claim 1;

forming a film on the substrate that has undergone the removing the foreign substance; and processing the substrate that has undergone the forming the film, thereby obtaining an article.

* * * * *